(12) United States Patent
Jiang

(10) Patent No.: US 11,659,620 B2
(45) Date of Patent: *May 23, 2023

(54) DATA TRANSMISSION METHOD AND DEVICE

(71) Applicant: Beijing Xiaomi Mobile Software Co., Ltd., Beijing (CN)

(72) Inventor: Xiaowei Jiang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/557,520

(22) Filed: Dec. 21, 2021

(65) Prior Publication Data

US 2022/0117034 A1   Apr. 14, 2022

Related U.S. Application Data

(63) Continuation of application No. 16/794,778, filed on Feb. 19, 2020, now Pat. No. 11,240,874, which is a
(Continued)

(51) Int. Cl.
*H04W 80/04* (2009.01)
*H04W 76/15* (2018.01)
(Continued)

(52) U.S. Cl.
CPC ........... *H04W 80/04* (2013.01); *H04L 1/0006* (2013.01); *H04L 5/0053* (2013.01); *H04W 28/06* (2013.01);
(Continued)

(58) Field of Classification Search
CPC ..... H04W 76/10; H04W 76/12; H04W 76/15; H04W 76/20; H04W 76/27; H04L 5/0053; H04L 1/006
See application file for complete search history.

(56) References Cited

U.S. PATENT DOCUMENTS

2016/0255619 A1   9/2016   Yi et al.
2018/0309660 A1   10/2018  Loehr et al.
(Continued)

FOREIGN PATENT DOCUMENTS

CN   105659690 A   6/2016
CN   106031292 A   10/2016
(Continued)

OTHER PUBLICATIONS

Huawei, HiSilicon, "Configuration and control of packet duplication", R2-1706716, 3GPP TSG RAN WG2 NR Ad Hoc, Qingdao, China, Jun. 27-29, 2017, 6 pgs.
(Continued)

*Primary Examiner* — Gary Mui
(74) *Attorney, Agent, or Firm* — Finnegan, Henderson, Farabow, Garrett & Dunner, L.L.P.

(57) ABSTRACT

A method for data transmission includes: receiving a first indication message from a base station, wherein the first indication message includes first information indicating a Packet Data Convergence Protocol (PDCP) packet duplication function and at least two transmission entities configured for a radio bearer (RB) by the base station; setting a transmission function corresponding to the RB to be the PDCP packet duplication function according to the first
(Continued)

indication message; setting a transmission entity corresponding to the RB according to the at least two transmission entities indicated in the first indication message; setting a present state of the PDCP packet duplication function, the present state being one of an activated state or a deactivated state; and performing data transmission according to the present state and the transmission entity.

20 Claims, 11 Drawing Sheets

Related U.S. Application Data continuation of application No. PCT/CN2017/098352, filed on Aug. 21, 2017.

(51) Int. Cl.

| | | |
|---|---|---|
| H04L 5/00 | (2006.01) | |
| H04W 76/27 | (2018.01) | |
| H04L 1/00 | (2006.01) | |
| H04W 28/06 | (2009.01) | |
| H04W 80/02 | (2009.01) | |

(52) U.S. Cl.
CPC ........... *H04W 76/15* (2018.02); *H04W 76/27* (2018.02); *H04W 80/02* (2013.01)

(56) References Cited

U.S. PATENT DOCUMENTS

| | | | |
|---|---|---|---|
| 2018/0324642 | A1 | 11/2018 | Yu et al. |
| 2018/0368107 | A1 | 12/2018 | Babaei et al. |
| 2018/0368132 | A1 | 12/2018 | Babaei et al. |
| 2018/0376457 | A1 | 12/2018 | Tseng et al. |
| 2019/0053325 | A1 | 2/2019 | Yu et al. |
| 2019/0327641 | A1 | 10/2019 | Mok et al. |
| 2020/0037151 | A1 | 1/2020 | Du et al. |
| 2020/0170072 | A1 | 5/2020 | Xiao et al. |
| 2020/0178327 | A1 | 6/2020 | Jiang |
| 2020/0213219 | A1 | 7/2020 | Tang |

FOREIGN PATENT DOCUMENTS

| | | |
|---|---|---|
| CN | 106664245 A | 5/2017 |
| CN | 106664737 A | 5/2017 |
| EP | 3 641 192 A1 | 4/2020 |
| JP | 2020502854 A | 1/2020 |
| RU | 2446629 C2 | 3/2012 |
| WO | WO 2018/143600 A1 | 8/2018 |

OTHER PUBLICATIONS

Huawei, "*PDCP duplication for CU-DU*", R3-173128, 3GPP TSG RAN WG3 meeting #97, Berlin, Germany, Aug. 21-25, 2017, 3 pgs.
Catt, "*Packet duplication configuration and control*", R2-1706361, 3GPP TSG-RAN WG2 Meeting #NR AH2, Qingdao, China, Jun. 27-29, 2017, 4 pgs.
Huawei, HiSilicon, "Packet Duplication for SRBs", R2-1706715, 3GPP TSG-RAN2 #98, Qingdao, China, Jun. 27-29, 2017, 4 pgs.
Sharp, "*PDCP Duplication in CA*", R2-1706791,3GPP TSG-RAN2 Ad Hoc Meeting, Qingdao, China, Jun. 27-29, 2017, 6 pgs.
Samsung,"*Further Discussion on Packet Duplication*", R2-1707366, 3GPP TSG-RAN WG2 Ad-hoc NR#2, Qingdao, China, Jun. 27-29, 2017, 3 pgs.
Vivo, "*Layer-2 behaviors of PDCP duplication activation deactivation*", R2-1708508, 3GPP TSG-RAN WG2 Meeting #99, Berlin, Germany, Aug. 21-25, 2017, 3 pgs.
Zte, "*Consideration on the activation/deactivation of data duplication for CA*", R2-1704660, 3GPP TSG-RAN WG2 Meeting #98, Hangzhou, China, May 15-19, 2017, 3 pgs.
ASUSTek, "*Activation and Deactivation of UL PDCP duplication*", R2-1706945 (Revision of R2-1705416), 3GPP TSG-RAN WG2 Meeting NR Ad-hoc #2, Qingdao, China, Jun. 27-29, 2017, 5 pgs.
Huawei, ASUSTek, HiSilicon, "*PDCP operation for packet duplication*", R2-1707719, 3GPP TSG-RAN WG2 #99, Berlin, Germany, Aug. 21-25, 2017, 6 pgs.
International Search Report in the International Application No. PCT/CN2017/098352, dated May 2, 2018.
English Translation of the Written Opinion of the International Search Authority in the International Application No. PCT/CN2017/098352, dated May 2, 2018.
Extended European Search Report in the European Application No. 17922883.8, dated Jun. 18, 2020.
First Office Action of the Chinese Application No. 201780001444.9, dated Jun. 8, 2020.
First Office Action of Russian Application No. 2020109837, dated Nov. 25, 2020.
Huawei, HiSilicon; "RLC behavior in duplicate activation and deactivation", 3GPP TSG RAN WG2 AH R2-1707249, Qingdao, China, Jun. 27-29, 2017, 3 pages.
China Telecom; "Consideration on configuration and control of PDCP duplication", 3GPP TSG-RAN WG2 Meeting NR #2 R2-1706931, Qingdao, China, Jun. 27-29, 2017, 2 pages.
Huawei, ASUSTeK, HiSilicon; "RLC behaviors upon duplicate deactivation", 3GPP TSG RAN WG2 #99 R2-1707718, Berlin, Germany, Aug. 21-25, 2017, 2 pages.
Ericsson; "PDCP and RLC behaviour for PDCP data duplication", 3GPP TSG-RAN WG2 #99 R2-1708329, Berlin, Germany, Aug. 21-25, 2017, 4 pages.
Samsung; "PDCP Duplication Operations", 3GPP TSG-RAN WG2 Meeting #99 R2-1709032, Berlin, Germany, Aug. 21-25, 2017, 2 pages.
CATT; "Impact of PDCP duplication on RLC", 3GPP TSG-RAN WG2 Meeting #NR AH2 R2-1706376, Qingdao, China, Jun. 27-29, 2017, 3 pages.
Nokia, Nokia Shanghai Bell; "Duplication Impacts to PDCP", 3GPP TSG-RAN WG2 #99 R2-1707990, Berlin, Germany, Aug. 21-25, 2017, 6 pages.
First Office Action of Korean Application No. 10-2020-7007059, dated Feb. 26, 2021.
First Office Action of Japanese Application No. 2020-509426, dated Mar. 15, 2021.
Office Communication dated Oct. 22, 2021, from European Patent Office in counterpart European Application No. 17922883.8.
Lenovo, Motorola Mobility, "PDCP packet duplication", Discussion and Decision, 3GPP TSG-RAN WG2 Meeting #99, R2-1708624, Aug. 21-25, 2017, Berlin, Germany, 4 pages.
Samsung, "PDCP Duplication Operations", Discussion & Decision, 3GPP TSG-RAN WG2 Ad-hoc NR#2, R2-1707368, Qingdao, China, Jun. 27-29, 2017, 3 pages.
Decision to Grant a Patent dated Dec. 6, 2021, from the Japanese Patent Office in counterpart Japanese Application No. 2020-509426.

DATA TRANSMISSION METHOD AND DEVICE

CROSS-REFERENCE TO RELATED APPLICATION

This application is a continuation of U.S. application Ser. No. 16/794,778, filed Feb. 19, 2020, which is a continuation of and claims priority to International Application No. PCT/CN2017/098352 filed on Aug. 21, 2017, the entire contents of both of which are incorporated herein by reference.

TECHNICAL FIELD

The present disclosure generally relates to the technical field of communication, and more particularly, to a data transmission method and device.

BACKGROUND

In a Long Term Evolution (LTE) system, a radio bearer (RB) generally is a set of logical radio resources. The RB may be a bearer between user equipment (UE) and a base station. The RB may be divided into a signaling radio bearer (SRB) and a data radio bearer (DRB) in terms of bearer contents. For achieving reliability of a data packet or a signaling packet, it has been allowed in a 5th-Generation (5G) system to adopt a packet duplication solution for a Packet Data Convergence Protocol (PDCP) layer of a user plane. However, such a packet duplication solution may not be implemented well using traditional methods.

SUMMARY

According to a first aspect of the embodiments of the present disclosure, a method for data transmission, implemented by a terminal, includes: receiving a first indication message from a base station, the first indication message including first information indicating a Packet Data Convergence Protocol (PDCP) packet duplication function and at least two transmission entities configured for a radio bearer (RB) by the base station; setting a transmission function corresponding to the RB to be the PDCP packet duplication function according to the first indication message; setting a transmission entity corresponding to the RB according to the at least two transmission entities indicated in the first indication message; setting a present state of the PDCP packet duplication function, the present state including an activated state and a deactivated state; and performing data transmission according to the present state and the transmission entity.

According to a second aspect of the embodiments of the present disclosure, a method for data transmission, implemented by a base station, includes: configuring a PDCP packet duplication function for an RB; configuring at least two transmission entities configured to implement the PDCP packet duplication function; adding first information into a first indication message, the first information indicating the PDCP packet duplication function and the at least two transmission entities; and sending the first indication message to a terminal to enable the terminal to set a transmission function corresponding to the RB to be the PDCP packet duplication function according to the first indication message and set a transmission entity corresponding to the RB according to the at least two transmission entities indicated in the first indication message.

According to a third aspect of the embodiments of the present disclosure, a data transmission device includes: a processor; and a memory configured to store an instruction executable for the processor, wherein the processor may be configured to: receive a first indication message from a base station, the first indication message including first information indicating a PDCP packet duplication function and at least two transmission entities configured for an RB by the base station; set a transmission function corresponding to the RB to be the PDCP packet duplication function according to the first indication message; set a transmission entity corresponding to the RB according to the at least two transmission entities indicated in the first indication message; set a present state of the PDCP packet duplication function, the present state including an activated state and a deactivated state; and perform data transmission according to the present state and the transmission entity.

According to a fourth aspect of the embodiments of the present disclosure, a data transmission device includes: a processor; and a memory configured to store an instruction executable for the processor, wherein the processor may be configured to: configure a PDCP packet duplication function for an RB; configure at least two transmission entities configured to implement the PDCP packet duplication function; add first information into a first indication message, the first information indicating the PDCP packet duplication function and the at least two transmission entities; and sending the first indication message to a terminal to enable the terminal to set a transmission function corresponding to the RB to be the PDCP packet duplication function according to the first indication message and set a transmission entity corresponding to the RB according to the at least two transmission entities indicated in the first indication message.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Terms used in the present disclosure are only adopted for the purpose of describing specific embodiments and not intended to limit the present disclosure. "A" and "an" in a singular form in the present disclosure and the appended claims are also intended to include a plural form, unless indicated otherwise. It is also to be understood that term "and/or" used in the present disclosure refers to and includes one or any or all possible combinations of multiple associated items that are listed.

It is to be understood that, although terms "first", "second", "third" and the like may be adopted to describe various information in the present disclosure, the information should not be limited to these terms. These terms are only adopted to distinguish the information of the same type. For example, without departing from the scope of the present disclosure, first information may also be referred to as second information and, similarly, second information may also be referred to as first information. The term "if" used here may be explained as "while" or "when" or "responsive to determining", which depends on the context.

Figure 1:
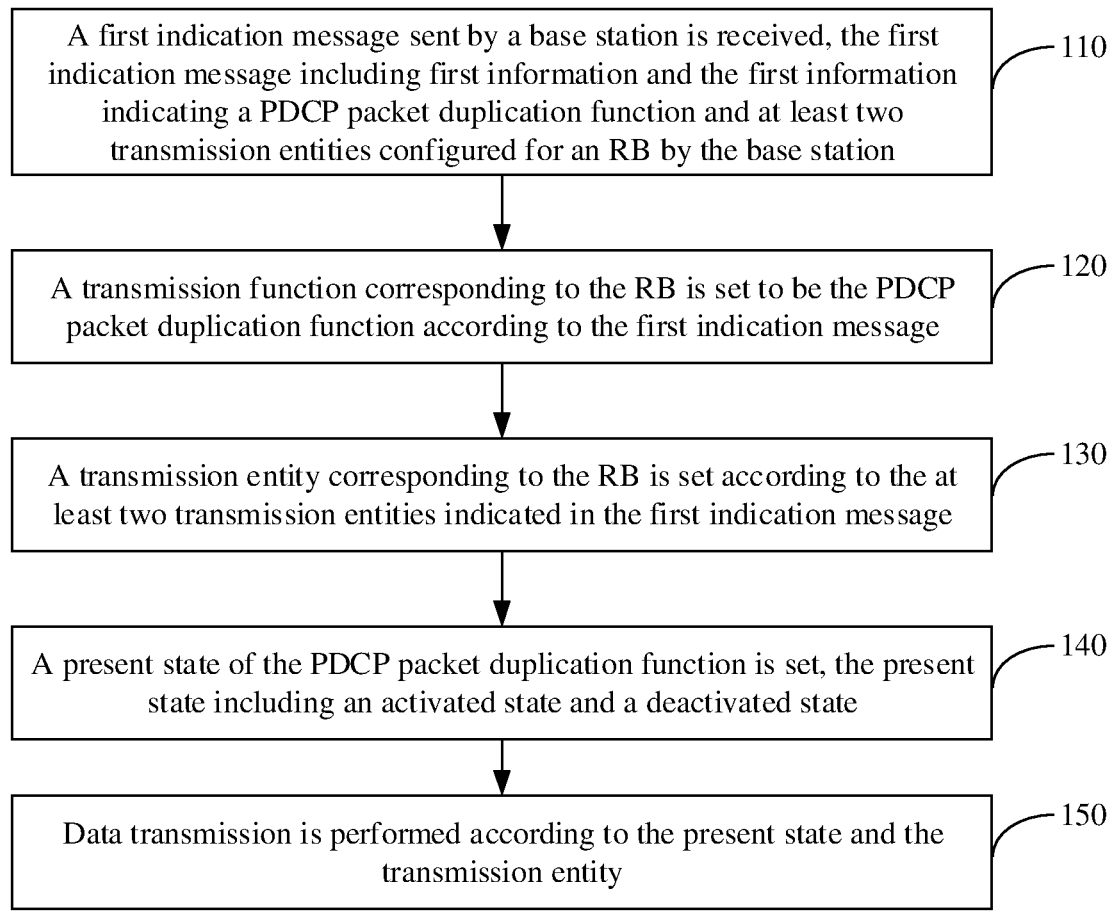
FIG. 1 is a flowchart illustrating a data transmission method according to an exemplary embodiment.

FIG. 1 is a flowchart illustrating a data transmission method according to an exemplary embodiment. The data transmission method may be applied to a terminal. As shown in FIG. 1, the data transmission method includes the following steps 110 to 150.

In step 110, a first indication message sent by a base station is received, the first indication message including first information and the first information indicating a Packet Data Convergence Protocol (PDCP) packet duplication function and at least two transmission entities configured for a radio bearer (RB) by the base station.

In the embodiment, the RB may be a signaling radio bearer (SRB) or a data radio bearer (DRB). Moreover, the RB may be a newly established SRB or DRB or may be an SRB or DRB that has been established.

The base station, after configuring the PDCP packet duplication function and transmission entities for the RB, may indicate them to the terminal through the first indication message; and the terminal, after receiving the first indication message, may learn a specific transmission function and transmission entities configured for the RB by the base station according to the first information in the first indication message.

Figure 2:
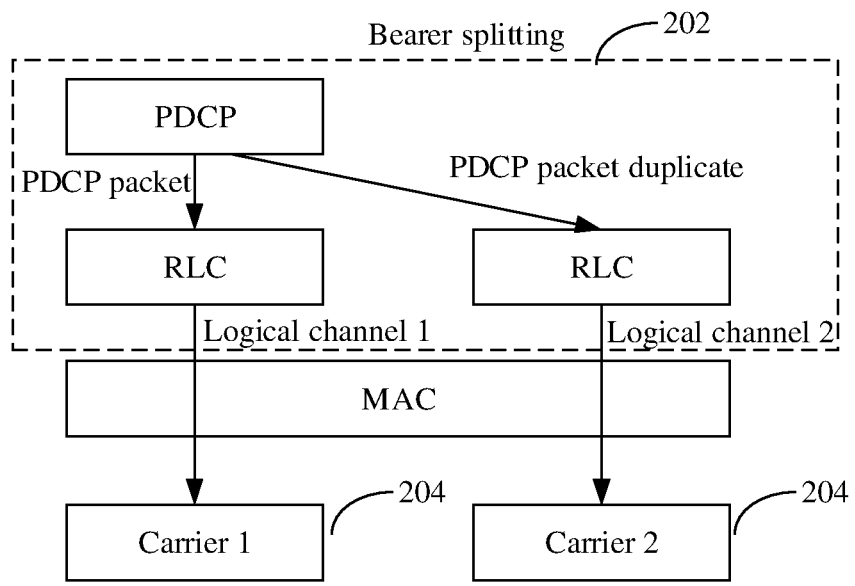
FIG. 2 is a schematic diagram illustrating combination of PDCP packet duplication with carriers according to an exemplary embodiment.

The PDCP packet duplication function may refer to duplicating data of a PDCP layer to obtain a PDCP packet and a PDCP packet duplicate and sending them through two different radio link control (RLC) entities. As shown in FIG. 2, combining PDCP packet duplication with carriers refers to mapping a PDCP layer to different logical channels through bearer splitting (202) and further mapping the mapped PDCP layer to different physical carriers (204).

The transmission entity may be an RLC entity needed for implementation of the PDCP packet duplication function. For example, a primary RLC entity and a secondary RLC entity are needed for implementation of the PDCP packet duplication function, and in such a case, the two RLC entities, i.e., the primary RLC entity and the secondary RLC entity, may be configured for the RB.

In step 120, a transmission function corresponding to the RB is set to be the PDCP packet duplication function according to the first indication message.

In the embodiment, the terminal may set the PDCP packet duplication function for the RB according to a configuration of the base station.

In step 130, a transmission entity corresponding to the RB is set according to the at least two transmission entities indicated in the first indication message.

In the embodiment, the terminal may set the transmission entity corresponding to the RB according to a configuration of the base station. For example, responsive to that the base station configures two transmission entities, the terminal may also set two transmission entities.

In step 140, a present state of the PDCP packet duplication function is set, the present state including an activated state and a deactivated state.

In the embodiment, the terminal may set the present state of the PDCP packet duplication function according to a configuration of the base station and, in a case that there is no configuration of the base station, the terminal may also set the present state of the PDCP packet duplication function according to a system default initial state.

In step 150, data transmission is performed according to the present state of the PDCP packet duplication function and the transmission entity corresponding to the RB.

In the embodiment, data transmission manners corresponding to the activated state and deactivated state of the PDCP packet duplication function can be different.

Figure 3:
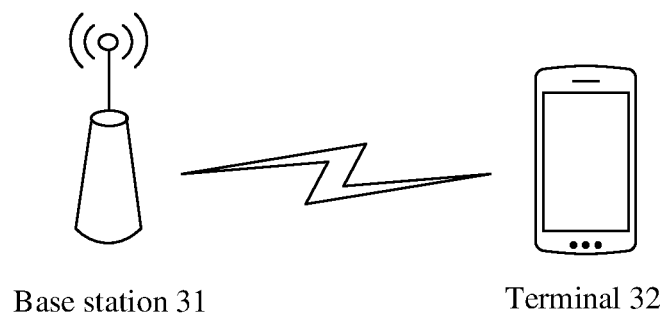
FIG. 3 is a scenario diagram of a data transmission method according to an exemplary embodiment.

In an exemplary scenario, as shown in FIG. 3, a base station 31 and a terminal 32 are included. The base station 31 may configure a PDCP packet duplication function for an RB, configure at least two transmission entities configured to implement the PDCP packet duplication function, add first information into a first indication message, the first information indicating the PDCP packet duplication function and at least two transmission entities configured for the RB by the base station, and send the first indication message to the terminal 32. The terminal 32 may receive the first indication message, may set a transmission function corresponding to the RB to be the PDCP packet duplication function according to a configuration of the base station and set a transmission entity corresponding to the RB according to a configuration of the base station 31, and further set a present state of the PDCP packet duplication function and perform data transmission according to the present state and the transmission entity.

In the embodiment, the terminal may receive the first indication message from the base station; the first indication message may include the first information and the first information may be for representing the PDCP packet duplication function and at least two transmission entities configured for the RB by the base station; the terminal may set the transmission function corresponding to the RB to be the PDCP packet duplication function according to the first indication message, set the transmission entity corresponding to the RB according to the at least two transmission entities indicated in the first indication message, set the present state of the PDCP packet duplication function, the present state including the activated state and the deactivated state, and perform data transmission according to the present state of the PDCP packet duplication function and the transmission entity corresponding to the RB, so that data transmission for the PDCP packet duplication function can be implemented, and the reliability of data transmission can be improved.

In an embodiment, the at least two transmission entities configured for the RB by the base station in step 110 may include a primary RLC entity and a secondary RLC entity, and in such a case, the terminal also may need to set the primary RLC entity and the secondary RLC entity for the RB.

In a case that the RB is a newly established SRB or DRB, a first RLC entity and a second RLC entity may be constructed, the first RLC entity may be set as the primary RLC entity, and the second RLC entity may be set as the secondary RLC entity.

In a case that the RB is an SRB or DRB that has been established, one RLC entity that has been constructed may be set as the primary RLC entity, and another RLC entity that has been constructed may be set as the secondary RLC entity.

In the embodiment, the terminal may further set a primary RLC entity and a secondary RLC entity corresponding to the RB according to the primary RLC entity and secondary RLC entity configured for the RB by the base station to satisfy the two transmission entities needed for implementation of the PDCP packet duplication function and may transmit the PDCP packet and the PDCP packet duplicate through the two transmission entities, so that the speed of data transmission can be increased, the reliability of data transmission can be improved, and the low sending success rate can be improved when the PDCP packet and the PDCP packet duplicate are transmitted on the same transmission entity.

In an embodiment, the step 140 of setting the present state of the PDCP packet duplication function may include at least one of the following setting manners.

In a first manner, the present state of the PDCP packet duplication function may be set as a system default initial state, the system default initial state including the activated state or the deactivated state.

In the embodiment, in a case that the system default initial state is the activated state, the present state of the PDCP packet duplication function may be set as the activated state; and similarly, in a case that the system default initial state is the deactivated state, the present state of the PDCP packet duplication function may be set as the deactivated state.

In a second manner, in a case that the first indication message further includes second information for representing an initial state, configured by the base station, of the PDCP packet duplication function and the initial state is the activated state or the deactivated state, the present state of the PDCP packet duplication function may be set as the initial state, configured by the base station, of the PDCP packet duplication function according to the second information.

In the embodiment, in a case that the initial state configured by the base station is the activated state, the present state of the PDCP packet duplication function may be set as the activated state; and similarly, in a case that the initial state configured by the base station is the deactivated state, the present state of the PDCP packet duplication function may be set as the deactivated state.

In a third manner, upon that an activation instruction for the PDCP packet duplication function is received from the base station, the present state of the PDCP packet duplication function may be set as the activated state according to the activation instruction.

In the embodiment, after the activation instruction for the PDCP packet duplication function is received from the base station, the present state of the PDCP packet duplication function may be required to be set as the activated state no matter in which state the PDCP packet duplication function was before.

In terms of priority of the three setting manners, the priority of the third manner may be the highest, that is, even though the present state of the PDCP packet duplication function has been set to be the deactivated state, the present state of the PDCP packet duplication function is also required to be switched from the deactivated state to the activated state upon that the activation instruction for the PDCP packet duplication function is received from the base station. The priority of the first manner may be the lowest, namely, the system default initial state is adopted only when no configuration of the base station is received.

In the embodiments, the present state of the PDCP packet duplication function may be set according to a configuration of the base station, and in a case that there is no configuration of the base station, the present state of the PDCP packet duplication function may also be set according to the system default initial state, so that subsequent data transmission according to the present state can be ensured, and diversity of data transmission can be improved.

In an embodiment, in step 150, the present state of the PDCP packet duplication function is the deactivated state, and the transmission entity corresponding to the RB includes the primary RLC entity and the secondary RLC entity. In such a case, during data transmission, whether the RB is a newly established SRB or DRB or is an SRB or DRB that has been established may need to be distinguished, and data transmission may be performed according to the distinguished RB.

When the RB is a newly established SRB or DR, data transmission may be performed by use of the primary RLC entity.

In the embodiment, PDCP may send a packet data unit (PDU) through the primary RLC entity, namely, a size of data that can be sent may be indicated through the PDCP to a logical channel corresponding to the primary RLC entity.

When the RB is an SRB or DRB that has been established, at least one of following data transmission manners may be further included.

In a first manner, data transmission for data that is not delivered to an RLC layer is performed by use of the primary RLC entity and data transmission for data that has been delivered to the secondary RLC entity is continued to be performed by use of the secondary RLC entity.

In the embodiment, the PDCP may send a subsequent PDU (PDU that has not yet been delivered to the RLC layer) through the primary RLC entity, and a PDU that has been sent to the secondary RLC entity may be still sent through the secondary RLC entity.

In a second manner, in an Acknowledge Mode (AM), data transmission is performed by use of the primary RLC entity for the data that is not delivered to the RLC layer and data that has been delivered to the secondary RLC entity but has not yet been successfully sent.

In the embodiment, for the AM, a PDU that has not yet been delivered to the RLC layer and a PDU that has been delivered to the secondary RLC entity but has not yet successfully sent may be sent by the PDCP through the primary RLC entity, and the secondary RLC entity that is not newly constructed may be reconstructed.

In a third manner, in an Unacknowledged Mode (UM), data transmission is performed by use of the primary RLC entity for the data that is not delivered to the RLC layer.

In a fourth manner, in the UM, data that has been delivered to the secondary RLC entity but has not yet been sent is reported by the RLC layer to a PDCP layer, and data transmission is performed by the PDCP layer by use of the primary RLC entity for the data that is not delivered to the RLC layer and the data that has been delivered to the secondary RLC entity but has not yet been sent.

In the embodiment, for the UM, the third and fourth manners may be adopted: the PDU that has not yet been delivered to the RLC layer is sent by the PDCP through the primary RLC entity; or, a specific PDU that has not yet been delivered to a next layer is indicated by the RLC layer to the PDCP, and the PDU that has not yet been delivered to the RLC layer and a PDU that has been delivered to the secondary RLC entity but has not yet been sent is sent by the PDCP layer through the primary RLC entity, and the secondary RLC entity that is not newly constructed may be reconstructed.

In the embodiment, in a case that the PDCP packet duplication function has not yet been activated, whether the RB is a newly established SRB or DRB or is an SRB or DRB that has been established may need to be distinguished for data transmission, and for the SRB or DRB that has been established, whether data transmission is for the data that is not delivered to the RLC layer or the data that has been delivered to the secondary RLC entity may further need to be distinguished, so that different processing can be implemented for data that is not sent and data that has been sent, and the reliability of data transmission can be improved.

In an embodiment, in the second and fourth manners, data transmission may be performed by use of the primary RLC entity for the data that is not delivered to the RLC layer and the data that has been delivered to the secondary RLC entity but has not yet been successfully sent, and the secondary RLC entity that has been constructed may be reconstructed.

In the embodiment, when data transmission is performed by use of the primary RLC entity for the data that is not delivered to the RLC layer and the data that has been delivered to the secondary RLC entity but has not yet been successfully sent, the secondary RLC entity that has been constructed may be reconstructed, namely, data in the secondary RLC entity that has been constructed is deleted, to prepare for subsequent data transmission, so that the reliability of data transmission can be improved.

In an embodiment, in step 150, the present state of the PDCP packet duplication function is the activated state; the transmission entity corresponding to the RB may include the primary RLC entity and the secondary RLC entity. In such a case, during data transmission, two transmission entities, i.e., the primary RLC entity and the secondary RLC entity, are required for data transmission, and there may be at least one of the following data transmission manners.

In a first manner, the data that is not delivered to the RLC layer is duplicated to obtain a PDCP packet and a PDCP packet duplicate, and the PDCP packet and the PDCP packet duplicate are sent through the primary RLC entity and the secondary RLC entity respectively.

In the embodiment, user equipment (UE) may generate a duplicate of the PDU that has not yet been delivered to the RLC layer and send the PDU and the duplicate through two RLC entities respectively, and the data that has been delivered to the RLC entity may be continued to be sent through the RLC entity.

In a second manner, in the AM, the data that is not delivered to the RLC layer is duplicated to obtain a PDCP packet and a PDCP packet duplicate, the PDCP packet and the PDCP packet duplicate are sent through the primary RLC entity and the secondary RLC entity respectively, data that has been delivered to one RLC entity but has not yet been successfully sent is duplicated to obtain another PDCP packet duplicate, and the another PDCP packet duplicate is sent through another RLC entity.

In the embodiment, for the AM, the UE may generate a duplicate of the PDU that has not yet been delivered to the RLC layer and send the PDU and the duplicate through two RLC entities respectively, and a duplicate of the PDU that has been delivered to the RLC entity but has not yet been successfully sent may be generated by the PDCP layer and sent through another RLC entity.

In a third manner, in the UM, data that has been delivered to the RLC layer is duplicated to obtain a PDCP packet and a PDCP packet duplicate, and the PDCP packet and the PDCP packet duplicate are sent through the primary RLC entity and the secondary RLC entity respectively.

In a fourth manner, in the UM, data that has not yet been sent is reported by the RLC layer to the PDCP layer, and data that is not delivered to the RLC layer is duplicated by the PDCP layer to obtain a PDCP packet and a PDCP packet duplicate, the PDCP packet and the PDCP packet duplicate is sent by the PDCP layer through the primary RLC entity and the secondary RLC entity respectively, the data that has been delivered to one RLC entity but has not yet been sent is duplicated to obtain another PDCP packet duplicate and the another PDCP packet duplicate is sent through another RLC entity.

In the embodiment, for the UM, the third and fourth manners may be adopted: for the UM, a duplicate of only the PDU that has not yet been delivered to the RLC layer may be generated by the PDCP, and the PDU and the duplicate may be sent through the two RLC entities respectively; or, a specific PDU that has not yet been delivered to a next layer may be indicated by the RLC layer to the PDCP, and then a duplicate of a PDU that has not yet been delivered to the RLC layer may be duplicated by the PDCP layer, and the PDU and the duplicate may be sent through two RLC entities respectively, and a duplicate of a PDU that has been delivered to the RLC layer but has not yet been sent may be generated by the PDCP layer and sent through another RLC entity, and the PDU that has been delivered to the secondary RLC entity but has not yet been sent may be sent through the primary RLC entity.

In the embodiment, after the PDCP packet duplication function is activated, the two transmission entities, i.e., the primary RLC entity and the secondary RLC entity, may be needed for data transmission and the PDCP packet and the PDCP packet duplicate may be sent through the primary RLC entity and the secondary RLC entity respectively or different transmission manners in the AM or the UM may be adopted, so that the data that is not sent and the data that has been sent may be transmitted in multiple transmission manners, the reliability of data transmission can be ensured, and meanwhile, the efficiency of data transmission can be also improved.

Figure 4:
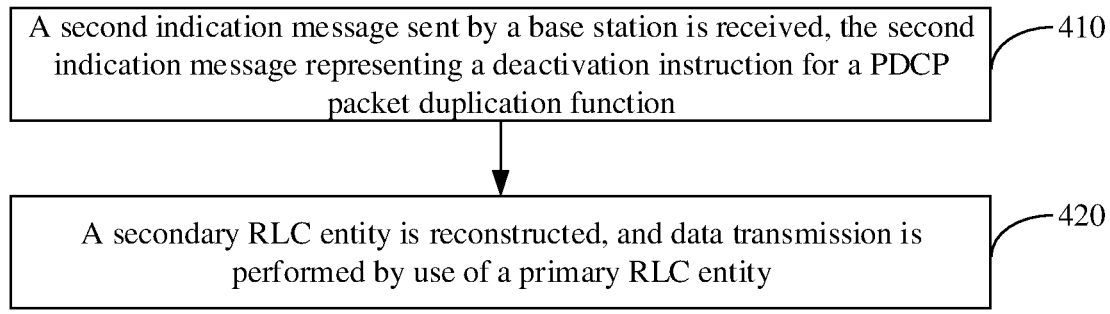
FIG. 4 is a flowchart illustrating a data transmission method according to an exemplary embodiment.

In an embodiment, the present state of the PDCP packet duplication function is the activated state, and as shown in FIG. 4, the data transmission method, based on the method shown in FIG. 1, may further include the following steps 410 to 420.

In step 410, a second indication message sent by the base station is received, the second indication message representing a deactivation instruction for the PDCP packet duplication function.

In step 420, the secondary RLC entity is reconstructed, and data transmission is performed by use of the primary RLC entity.

In the embodiment, after the deactivation instruction for the PDCP packet duplication function is received from the base station, the secondary RLC entity may be reconstructed, and data transmission is performed by use of the primary RLC entity, so that successful data transmission can still be ensured when the PDCP packet duplication function is deactivated, and the reliability of data transmission can be improved.

Figure 5:
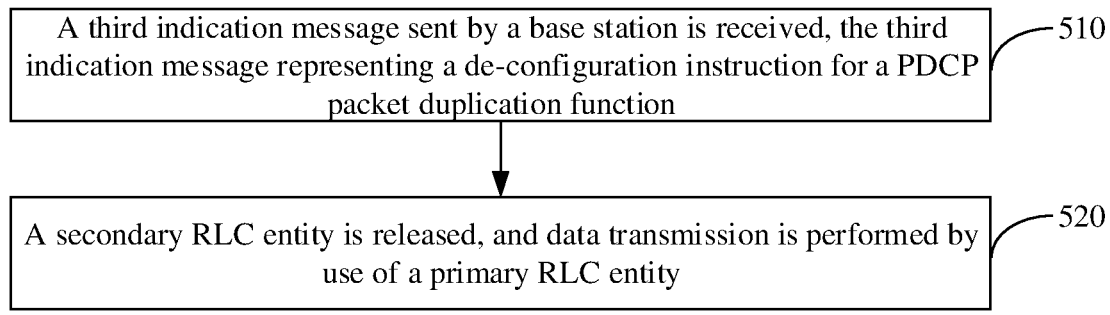
FIG. 5 is a flowchart illustrating a data transmission method according to an exemplary embodiment.

In an embodiment, as shown in FIG. 5, the data transmission method, based on the method shown in FIG. 1, may further include the following steps 510 to 520.

In step 510, a third indication message sent by the base station is received, the third indication message representing a de-configuration instruction for the PDCP packet duplication function.

In step 520, the secondary RLC entity is released, and data transmission is performed by use of the primary RLC entity.

In the embodiment, since the third indication message does not include the RLC entity configured by the base station and specified to be released, the secondary RLC entity may be released as a default.

In the embodiment, after the deactivation instruction for the PDCP packet duplication function is received from the base station, the secondary RLC entity may be reconstructed, and data transmission is performed by use of the primary RLC entity, so that successful data transmission can still be ensured when the PDCP packet duplication function is deactivated, and the reliability of data transmission can be improved.

Figure 6:
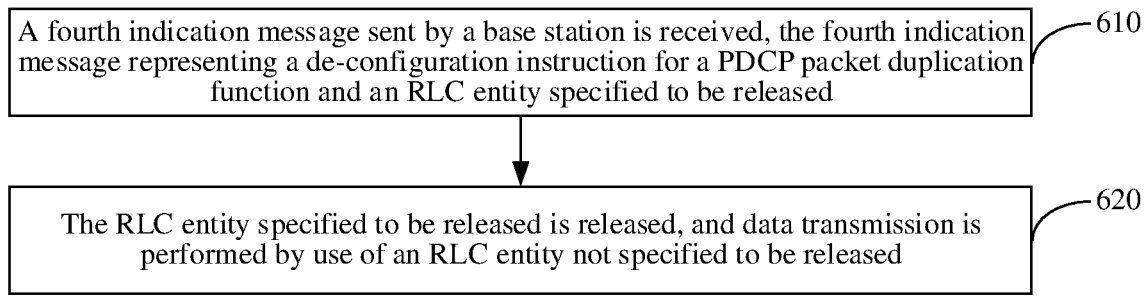
FIG. 6 is a flowchart illustrating a data transmission method according to an exemplary embodiment.

In an embodiment, as shown in FIG. 6, the data transmission method, based on the method shown in FIG. 1, may further include the following steps 610 to 620.

In step 610, a fourth indication message sent by the base station is received, the fourth indication message representing the de-configuration instruction for the PDCP packet duplication function and an RLC entity specified to be released.

In the embodiment, the RLC entity specified to be released may be one of the at least two transmission entities configured for the RB by the base station. For example, the RLC entity specified to be released is one of the primary RLC entity and the secondary RLC entity.

In step 620, the RLC entity specified to be released is released, and data transmission is performed by use of an RLC entity not specified to be released.

In the embodiment, in a case that the RLC entity specified to be released is the primary RLC entity, data transmission may be performed by use of the secondary RLC entity; and in a case that the RLC entity specified to be released is the secondary RLC entity, data transmission may be performed by use of the primary RLC entity.

In the embodiment, after the de-configuration instruction for the PDCP packet duplication function and the RLC entity specified to be released are received from the base station, the RLC entity specified to be released may be released, and data transmission may be performed by use of a RLC entity not specified to be released, so that successful data transmission can still be ensured by use of the RLC entity not specified to be released when the PDCP packet duplication function is de-configured and the base station specifies the RLC entity to be released, and thus the reliability of data transmission can be improved.

Figure 7:
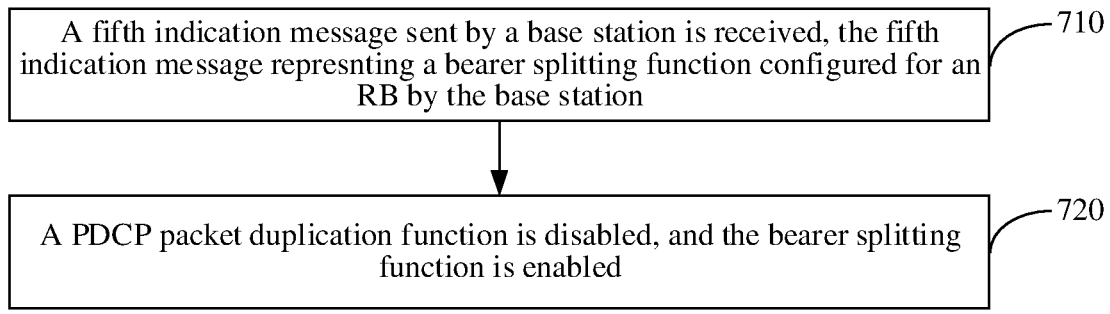
FIG. 7 is a flowchart illustrating a data transmission method according to an exemplary embodiment.

In an embodiment, as shown in FIG. 7, the data transmission method, based on the method shown in FIG. 1, may further include the following steps 710 to 720.

In step 710, a fifth indication message sent by the base station is received, the fifth indication message representing a bearer splitting function configured for the RB by the base station.

In step 720, the PDCP packet duplication function is disabled, and the bearer splitting function is enabled.

In such a manner, for the data that has been delivered to the RLC layer, at least one of the following data transmission manners may be included.

In a first manner, data transmission is continued to be performed by use of the primary RLC entity and the secondary RLC entity.

In a second manner, in a case that the present state of the PDCP packet duplication function is the activated state prior to that the PDCP packet duplication function is disabled, the secondary RLC entity may be reconstructed.

In a third manner, in a case that the present state of the PDCP packet duplication function is the deactivated state prior to that the PDCP packet duplication function is disabled, data transmission may be continued to be performed by use of the primary RLC entity and the secondary RLC entity.

In the embodiment, after the bearer splitting function configured for the RB by the base station is received, the PDCP packet duplication function may be disabled, the bearer splitting function may be enabled and the data that has been delivered to the RLC layer may be transmitted in more than one manner, so that successful data transmission can still be ensured even when different functions are switched, and the reliability of data transmission can be improved.

Figure 8:
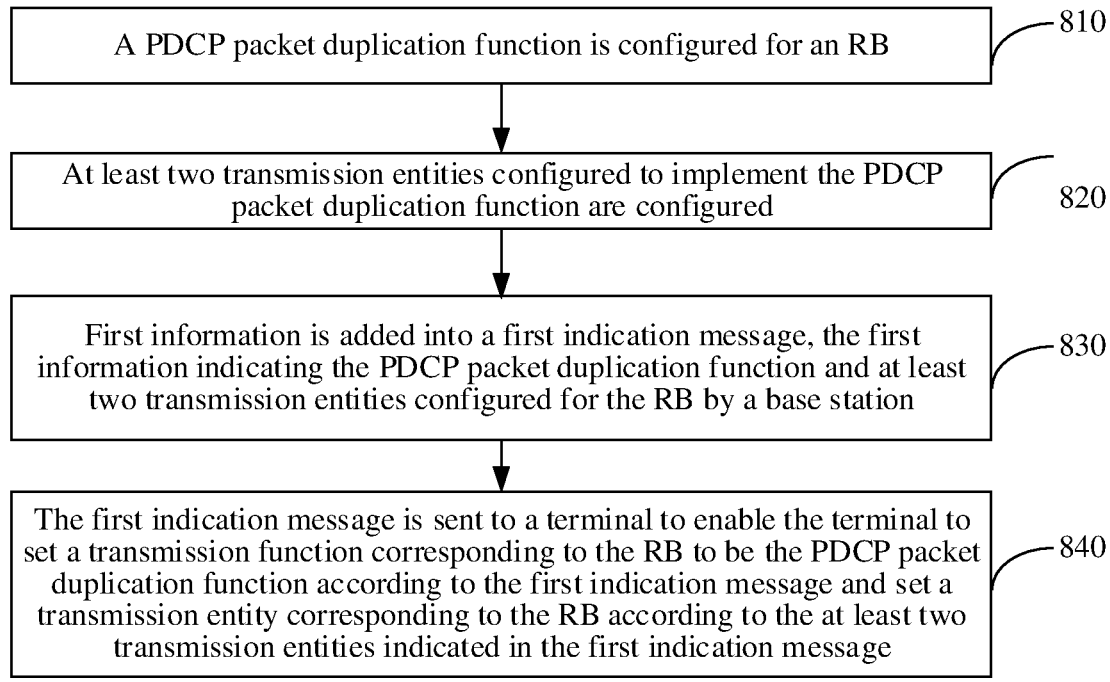
FIG. 8 is a flowchart illustrating a data transmission method according to an exemplary embodiment.

FIG. 8 is a flowchart illustrating a data transmission method according to an exemplary embodiment. The data transmission method may be applied to a base station. As shown in FIG. 8, the data transmission method includes the following steps 810 to 840.

In step 810, a PDCP packet duplication function is configured for an RB.

In the embodiment, all transmission functions that can be implemented by the same RB may be configured by the base station, and a terminal may make corresponding settings according to a configuration of the base station.

In step 820, at least two transmission entities configured to implement the PDCP packet duplication function are configured.

In the embodiment, the transmission entity may be an RLC entity needed for implementation of the PDCP packet duplication function. For example, a primary RLC entity and a secondary RLC entity may be needed for implementation of the PDCP packet duplication function, and in such a case, the two RLC entities, i.e., the primary RLC entity and the secondary RLC entity, may be configured for the RB.

In step 830, first information is added into a first indication message, the first information indicating the PDCP packet duplication function and at least two transmission entities configured for the RB by the base station.

In the embodiment, in a case that the base station configures the PDCP packet duplication function, the primary RLC entity and the secondary RLC entity for the RB, configuration information of the base station may be sent to a terminal through the first indication message.

In step 840, the first indication message is sent to a terminal to enable the terminal to set a transmission function corresponding to the RB to be the PDCP packet duplication function according to the first indication message and set a transmission entity corresponding to the RB according to the at least two transmission entities indicated in the first indication message.

In the embodiment, a PDCP packet duplication function may be configured for an RB, at least two transmission entities configured to implement the PDCP packet duplication function may be configured, first information may be added into a first indication message, the first information indicating the PDCP packet duplication function and the at least two transmission entities configured for the RB by the base station, so that the first indication message can be sent to the terminal to enable the terminal to set a transmission function corresponding to the RB to be the PDCP packet duplication function according to the first indication message and set a transmission entity corresponding to the RB according to the at least two transmission entities indicated in the first indication message, and then the terminal can set a transmission entity corresponding to the RB according to the at least two transmission entities indicated in the first indication message, set a present state of the PDCP packet duplication function, the present state including an activated state and a deactivated state, and perform data transmission according to the present state of the PDCP packet duplication function and the transmission entity corresponding to the RB, so that data transmission for the PDCP packet duplication function can be implemented, and the reliability of data transmission can be improved.

Figure 9:
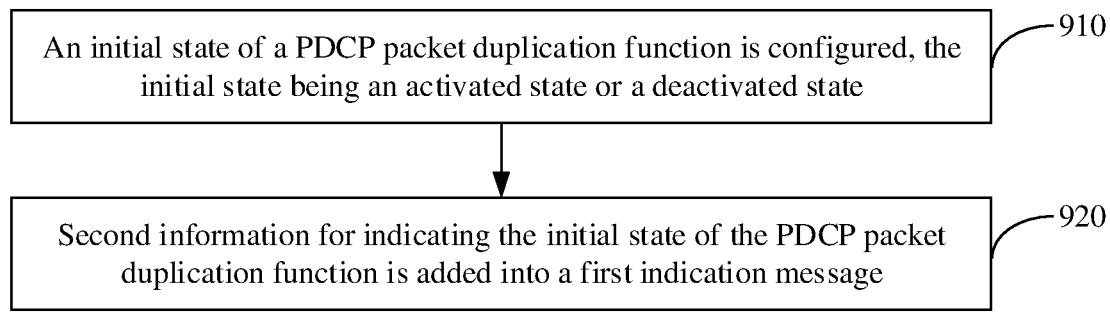
FIG. 9 is a flowchart illustrating a data transmission method according to an exemplary embodiment.

In an embodiment, as shown in FIG. 9, the data transmission method, based on the method shown in FIG. 8, may further include the following steps 910 to 920.

In step 910, an initial state of the PDCP packet duplication function is configured, the initial state being an activated state or a deactivated state.

In the embodiment, the base station may configure an initial state of the PDCP packet duplication function for enabling the terminal to set a present state of the PDCP packet duplication function according to the initial state configured by the base station.

In step 920, second information for representing the initial state of the PDCP packet duplication function is added into the first indication message.

In the embodiment, the initial state of the PDCP packet duplication function may be configured, the initial state being an activated state or a deactivated state, to enable the terminal to set a present state of the PDCP packet duplication function according to a configuration of the base station and further perform data transmission according to the present state, and then the base station may flexibly determine whether to activate the PDCP packet duplication function or not, so that the base station can control the initial state of the PDCP packet duplication function and indirectly make a unified control over data transmission of the terminal, and the reliability of data transmission can be improved.

In an embodiment, after step 840, for the RB which has been configured with the PDCP packet duplication function, in a case that the PDCP packet duplication function is in the activated state, the base station may instruct the terminal to deactivate the PDCP packet duplication function.

In such a manner, the base station may send a second indication message to the terminal, the second indication message representing a deactivation instruction for the PDCP packet duplication function.

In the embodiment, the second indication message may be sent to the terminal, the second indication message representing a deactivation instruction for the PDCP packet duplication function, so that the base station can deactivate the PDCP packet duplication function, the controllability of data transmission can be improved, and the reliability of data transmission can be improved.

In an embodiment, after step 840, for the RB which is configured with the PDCP packet duplication function, the base station may instruct the terminal to de-configure the PDCP packet duplication function.

In such a manner, the base station may send a third indication message to the terminal, the third indication message representing a de-configuration instruction for the PDCP packet duplication function.

In the embodiment, the third indication message may be sent to the terminal, the third indication message representing a de-configuration instruction for the PDCP packet duplication function, so that the base station can de-configure the PDCP packet duplication function, the controllability of data transmission can be improved, and the reliability of data transmission can be improved.

In an embodiment, after step 840, for the RB which is configured with the PDCP packet duplication function, the base station may further instruct the terminal to de-configure the PDCP packet duplication function and specify an RLC entity to be released.

In such a manner, the base station may send a fourth indication message to the terminal, the fourth indication message representing a de-configuration instruction for the PDCP packet duplication function and an RLC entity specified to be released.

In the embodiment, the RLC entity specified to be released may be one of the at least two transmission entities configured for the RB by the base station. For example, the RLC entity specified to be released may be one of the primary RLC entity and the secondary RLC entity.

In the embodiment, the fourth indication message may be sent to the terminal, the fourth indication message representing a de-configuration instruction for the PDCP packet duplication function and representing an RLC entity specified to be released, so that the base station can de-configure the PDCP packet duplication function and also implement control over the RLC entity, furthermore, the data transmission can be controlled better, and the reliability of data transmission can be improved.

In an embodiment, after step 840, for the RB which is configured with the PDCP packet duplication function, the base station may instruct the terminal to configure a bearer splitting function.

In such a manner, the base station may send a fifth indication message to the terminal, the fifth indication message representing a bearer splitting function configured for the RB by the base station.

In the embodiment, the fifth indication message may be sent to the terminal, the fifth indication message representing a bearer splitting function configured for the RB by the base station, so that handover between the PDCP packet duplication function and the bearer splitting function can be implemented, one or more transmission functions can further be realized for the same RB by use of at least two shared transmission entities, transmission functions of the RB can be enriched, and the practicability of data transmission can be improved.

Corresponding to the embodiments of the data transmission method, the present disclosure also provides embodiments of a data transmission device.

Figure 10:
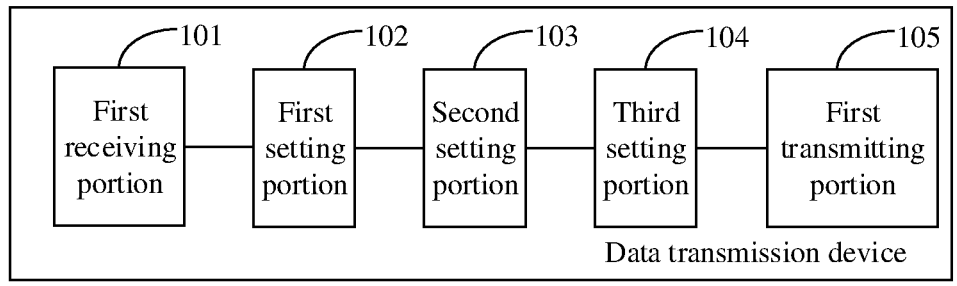
FIG. 10 is a block diagram of a data transmission device according to an exemplary embodiment.

FIG. 10 is a block diagram of a data transmission device according to an exemplary embodiment. The data transmission device may be applied to a terminal, and is configured to execute the data transmission method shown in FIG. 1. As shown in FIG. 10, the data transmission device may include:

a first receiving portion 101, configured to receive a first indication message from a base station, the first indication message including first information and the first information indicating a PDCP packet duplication function and at least two transmission entities configured for an RB by the base station;

a first setting portion 102, configured to set a transmission function corresponding to the RB to be the PDCP packet duplication function according to the first indication message;

a second setting portion 103, configured to set a transmission entity corresponding to the RB according to the at least two transmission entities indicated in the first indication message;

a third setting configuration portion 104, configured to set a present state of the PDCP packet duplication function, the present state including an activated state and a deactivated state; and a first transmitting portion 105, configured to perform data transmission according to the present state and the transmission entity.

In the embodiment, the terminal may receive a first indication message from the base station, the first indication message including first information and the first information indicating a PDCP packet duplication function and at least two transmission entities configured for the RB by the base station, set a transmission function corresponding to an RB to be the PDCP packet duplication function according to the first indication message, set a transmission entity corresponding to the RB according to the at least two transmission entities indicated in the first indication message, set a present state of the PDCP packet duplication function, the present state including an activated state and a deactivated state, and perform data transmission according to the present state of the PDCP packet duplication function and the transmission entity corresponding to the RB, so that data transmission for the PDCP packet duplication function is implemented, and the reliability of data transmission can be improved.

Figure 11:
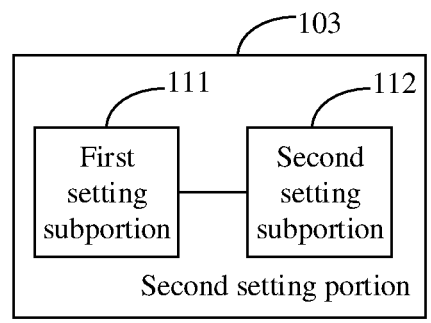

In an embodiment, as shown in FIG. 11, based on the device shown in FIG. 10, the at least two transmission entities configured by the base station include a primary RLC entity and a secondary RLC entity, and the second setting portion 103 may include:

a first setting subportion 111, configured to, in a case that the RB is a newly established SRB or DRB, construct a first RLC entity and a second RLC entity, set the first RLC entity as the primary RLC entity and set the second RLC entity as the secondary RLC entity; and a second setting subportion 112, configured to, in a case that the RB is an SRB or DRB that has been established, set one RLC entity that has been constructed as the primary RLC entity and set another RLC entity that has been constructed as the secondary RLC entity.

In the embodiment, the terminal may further set a primary RLC entity and a secondary RLC entity corresponding to the RB according to the primary RLC entity and secondary RLC entity configured for the RB by the base station to satisfy the two transmission entities needed for implementation of the PDCP packet duplication function and may transmit a PDCP packet and a PDCP packet duplicate through the two transmission entities, so that the speed of data transmission can be increased, the reliability of data transmission can be improved, and a low sending success rate can be upgraded when the PDCP packet and the PDCP packet duplicate are transmitted on the same transmission entity.

Figure 12:
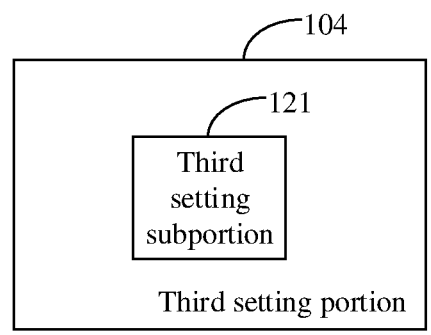
FIG. 12 is a block diagram of a data transmission device according to an exemplary embodiment.

In an embodiment, as shown in FIG. 12, based on the device shown in FIG. 10, the third setting portion 104 may include:

a third setting subportion 121, configured to adopt at least one of the following setting manners:

setting the present state to be a system default initial state, the system default initial state including the activated state or the deactivated state; or in a case that the first indication message further includes second information, the second information is for representing an initial state, configured by the base station, of the PDCP packet duplication function and the initial state is the activated state or the deactivated state, setting the present state to be the initial state, configured by the base station, of the PDCP packet duplication function according to the second information; or in a case that an activation instruction for the PDCP packet duplication function is received from the base station, setting the present state to be the activated state according to the activation instruction.

In the embodiment, the present state of the PDCP packet duplication function may be set according to a configuration of the base station, and in a case that there is no configuration of the base station, the present state of the PDCP packet duplication function may also be set according to the system default initial state, so that subsequent data transmission according to the present state can be ensured, and diversity of data transmission can be improved.

Figure 13:
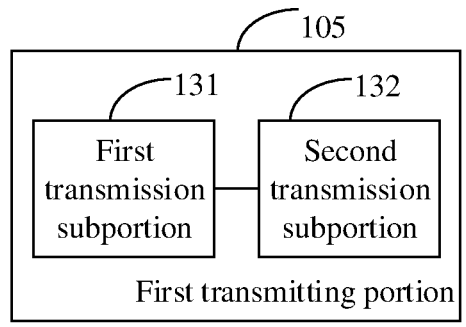
FIG. 13 is a block diagram of a data transmission device according to an exemplary embodiment.

In an embodiment, as shown in FIG. 13, based on the device shown in FIG. 10, the present state of the PDCP packet duplication function is the deactivated state, the transmission entity corresponding to the RB includes the primary RLC entity and the secondary RLC entity, and the first transmitting portion 105 may include:

a first transmission subportion 131, configured to, in a case that the RB is a newly established SRB or DRB, perform data transmission by use of the primary RLC entity; and a second transmission subportion 132, configured to, in a case that the RB is an SRB or DRB that has been established, adopt at least one of the following data transmission manners:

performing data transmission by use of the primary RLC entity for data that is not delivered to an RLC layer and continuing the data transmission by use of the secondary RLC entity for data that has been delivered to the secondary RLC entity, or in an AM, performing data transmission by use of the primary RLC entity for the data that is not delivered to the RLC layer and data that has been delivered to the secondary RLC entity but has not yet been successfully sent, or in a UM, performing data transmission by use of the primary RLC entity for the data that is not delivered to the RLC layer, or in a UM, reporting to a PDCP layer, by the RLC layer, data that has been delivered to the secondary RLC entity but has not yet been sent and performing, by the PDCP layer, data transmission by use of the primary RLC entity for the data that is not delivered to the RLC layer and the data that has been delivered to the secondary RLC entity but has not yet been sent.

In the embodiment, in a case that the PDCP packet duplication function has not yet been activated, whether the RB is a newly established SRB or DRB or is an SRB or DRB that has been established may need to be distinguished for data transmission, and particularly for the SRB or DRB that has been established, whether data transmission is for the data that is not delivered to the RLC layer or the data that has been delivered to the secondary RLC entity may further need to be distinguished, so that different processing is implemented for data that is not sent and data that has been sent, and the reliability of data transmission can be improved.

In an embodiment, the second transmission subportion 132 may further include:

a third transmission subportion, configured to, when data transmission may be performed by use of the primary RLC entity for the data that is not delivered to the RLC layer and the data that has been delivered to the secondary RLC entity but has not yet been successfully sent, reconstruct the secondary RLC entity that has been constructed.

In the embodiment, in a case that data transmission is performed by use of the primary RLC entity for the data that is not delivered to the RLC layer and the data that has been delivered to the secondary RLC entity but has not yet been successfully sent, the secondary RLC entity that has been constructed may be reconstructed, namely, data in the secondary RLC entity that has been constructed is deleted, to prepare for subsequent data transmission, so that the reliability of data transmission can be improved.

Figure 14:
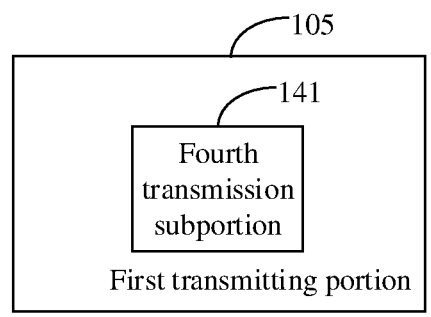
FIG. 14 is a block diagram of a data transmission device according to an exemplary embodiment.

In an embodiment, as shown in FIG. 14, based on the device shown in FIG. 10, the present state of the PDCP packet duplication function is the deactivated state, the transmission entity corresponding to the RB includes the primary RLC entity and the secondary RLC entity, and the first transmitting portion 105 may include:

a fourth transmission subportion 141, configured to adopt at least one of the following data transmission manners:

duplicating the data that is not delivered to the RLC layer to obtain a PDCP packet and a PDCP packet duplicate and sending the PDCP packet and the PDCP packet duplicate through the primary RLC entity and the secondary RLC entity respectively; or in an AM, duplicating the data that is not delivered to the RLC layer to obtain a PDCP packet and a PDCP packet duplicate, sending the PDCP packet and the PDCP packet duplicate through the primary RLC entity and the secondary RLC entity respectively, duplicating data that has been delivered to one RLC entity but has not yet been successfully sent to obtain another PDCP packet duplicate and sending the another PDCP packet duplicate through another RLC entity; or in a UM, duplicating data that has been delivered to an RLC layer to obtain a PDCP packet and a PDCP packet duplicate and sending the PDCP packet and the PDCP packet duplicate through the primary RLC entity and the secondary RLC entity respectively; or in a UM, reporting to the PDCP layer, by the RLC layer, data that has not yet been sent; and duplicating, by the PDCP layer, the data that is not delivered to the RLC layer to obtain a PDCP packet and a PDCP packet duplicate, sending the PDCP packet and the PDCP packet duplicate through the primary RLC entity and the secondary RLC entity respectively; duplicating the data that has been delivered to one RLC entity but has not yet been sent to obtain another PDCP packet duplicate and sending the another PDCP packet duplicate through another RLC entity.

In the embodiment, after the PDCP packet duplication function is activated, the two transmission entities, i.e., the primary RLC entity and the secondary RLC entity, may be needed for data transmission, and the PDCP packet and the PDCP packet duplicate may be sent through the primary RLC entity and the secondary RLC entity respectively, or different transmission manners in the AM or the UM may be adopted, so that the data that is not sent and has been sent may be transmitted in multiple transmission manners, the reliability of data transmission can be ensured, and meanwhile, the efficiency of data transmission can be improved.

Figure 15:
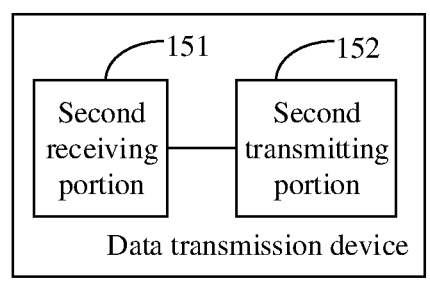
FIG. 15 is a block diagram of another data transmission device according to an exemplary embodiment.

In an embodiment, as shown in FIG. 15, based on the device shown in FIG. 10, the present state of the PDCP packet duplication function is the deactivated state, and the device may further include:

a second receiving portion 151, configured to receive a second indication message from the base station, the second indication message representing a deactivation instruction for the PDCP packet duplication function; and a second transmitting portion 152, configured to reconstruct the secondary RLC entity and perform data transmission by use of the primary RLC entity.

In the embodiment, after the deactivation instruction for the PDCP packet duplication function is received from the base station, the secondary RLC entity may be reconstructed, and data transmission may be performed by use of the primary RLC entity, so that successful data transmission can still be ensured when the PDCP packet duplication function is deactivated, and the reliability of data transmission can be improved.

Figure 16:
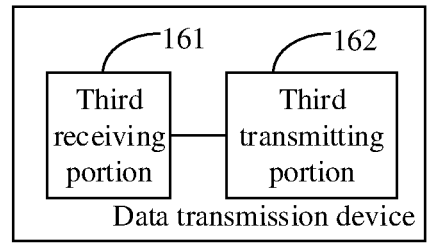
FIG. 16 is a block diagram of a data transmission device according to an exemplary embodiment.

In an embodiment, as shown in FIG. 16, based on the device shown in FIG. 10, the device may further include:

a third receiving portion 161, configured to receive a third indication message from the base station, the third indication message representing a de-configuration instruction for the PDCP packet duplication function; and a third transmitting portion 162, configured to release the secondary RLC entity and perform data transmission by use of the primary RLC entity.

In the embodiment, after the de-configuration instruction for the PDCP packet duplication function is received from the base station, the secondary RLC entity may further be released, and data transmission may be performed by use of the primary RLC entity, so that successful data transmission can still be ensured when the PDCP packet duplication function is de-configured, and the reliability of data transmission can be improved.

Figure 17:
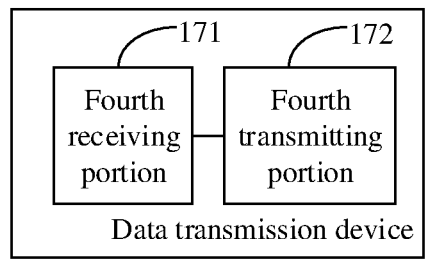
FIG. 17 is a block diagram of a data transmission device according to an exemplary embodiment.

In an embodiment, as shown in FIG. 17, based on the device shown in FIG. 10, the device may further include:

a fourth receiving portion 171, configured to receive a fourth indication message from the base station, the fourth indication message representing the de-configuration instruction for the PDCP packet duplication function and representing an RLC entity specified to be released; and a fourth transmitting portion 172, configured to release the RLC entity specified to be released and perform data transmission by use of an RLC entity not specified to be released.

In the embodiment, after the de-configuration instruction for the PDCP packet duplication function and the RLC entity specified to be released are received from the base station, the RLC entity specified to be released may be released, and data transmission may be performed by use of an RLC entity not specified to be released, so that successful data transmission can still be ensured by use of the RLC entity not specified to be released in a case that the PDCP packet duplication function is de-configured and the base station specifies the RLC entity to be released, and the reliability of data transmission can be improved.

Figure 18:
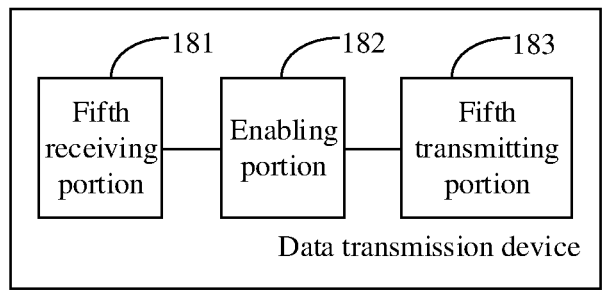
FIG. 18 is a block diagram of a data transmission device according to an exemplary embodiment.

In an embodiment, as shown in FIG. 18, based on the device shown in FIG. 10, the device may further include:

a fifth receiving portion 181, configured to receive a fifth indication message from the base station, the fifth indication message representing a bearer splitting function configured for the RB by the base station;

an enabling portion 182, configured to disable the PDCP packet duplication function and enable the bearer splitting function; and a fifth transmitting portion 183, configured to adopt at least one of the following data transmission manners for the data that has been delivered to the RLC layer:

continuing the data transmission by use of the primary RLC entity and the secondary RLC entity, or in a case that the present state of the PDCP packet duplication function is the activated state prior to that the PDCP packet duplication function is disabled, reconstructing the secondary RLC entity, or in a case that the present state of the PDCP packet duplication function is the deactivated state prior to that the PDCP packet duplication function is disabled, continuing the data transmission by use of the primary RLC entity and the secondary RLC entity.

In the embodiment, after the bearer splitting function configured for the RB by the base station is received, the PDCP packet duplication function may be disabled, the bearer splitting function may be enabled and the data that has been delivered to the RLC layer may be transmitted in more than one manner, so that successful data transmission can still be ensured even when handover between different functions is performed, and the reliability of data transmission can be improved.

Figure 19:
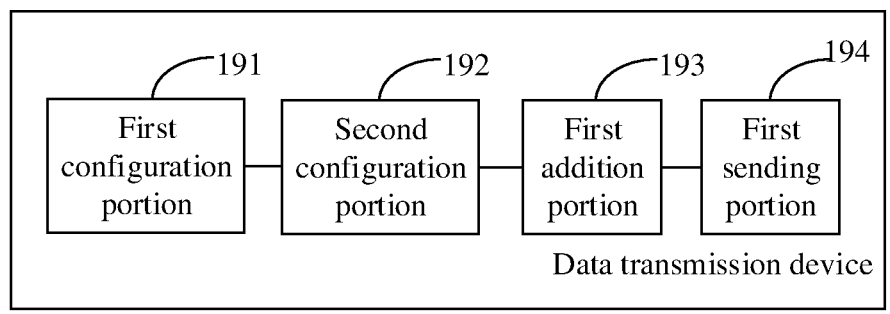
FIG. 19 is a block diagram of a data transmission device according to an exemplary embodiment.

FIG. 19 is a block diagram of a data transmission device according to an exemplary embodiment. The data transmission device may be applied to a base station, and is configured to execute the data transmission method shown in FIG. 8. As shown in FIG. 19, the data transmission device may include:

a first configuration portion 191, configured to configure a PDCP packet duplication function for an RB;

a second configuration portion 192, configured to configure at least two transmission entities configured to implement the PDCP packet duplication function;

a first addition portion 193, configured to add first information into a first indication message, the first information indicating the PDCP packet duplication function and the at least two transmission entities; and a first sending portion 194, configured to send the first indication message to a terminal to enable the terminal to set a transmission function corresponding to the RB to be the PDCP packet duplication function according to the first indication message and set a transmission entity corresponding to the RB according to the at least two transmission entities indicated in the first indication message.

In the embodiment, a PDCP packet duplication function is configured for an RB, at least two transmission entities configured to implement a PDCP packet duplication function are configured, first information is added into first indication message, the first information indicating the PDCP packet duplication function and at least two transmission entities configured for the RB by the base station, and the first indication message is sent to the terminal, therefore, the terminal can set a transmission function corresponding to the RB to be the PDCP packet duplication function according to the first indication message and set a transmission entity corresponding to the RB according to the at least two transmission entities indicated in the first indication message, and then the terminal can set the transmission entity corresponding to the RB according to the at least two transmission entities indicated in the first indication message, set a present state of the PDCP packet duplication function, the present state including an activated state and a deactivated state, and can perform data transmission according to the present state of the PDCP packet duplication function and the transmission entity corresponding to the RB, so that data transmission for the PDCP packet duplication function is implemented, and the reliability of data transmission can be improved.

Figure 20:
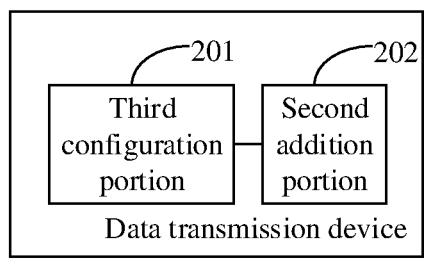
FIG. 20 is a block diagram of a data transmission device according to an exemplary embodiment.

In an embodiment, as shown in FIG. 20, based on the device shown in FIG. 19, the device may further include:

a third configuration portion 201, configured to configure an initial state of the PDCP packet duplication function, the initial state being an activated state or a deactivated state; and a second addition portion 202, configured to add second information for representing the initial state into the first indication message.

In the embodiment, an initial state of a PDCP packet duplication function is configured, the initial state being an activated state or a deactivated state, therefore, the terminal can set a present state of the PDCP packet duplication function according to a configuration of the base station and further can perform data transmission according to the present state, and then the base station can flexibly determine whether to activate the PDCP packet duplication function or not, so that the base station can control the initial state of the PDCP packet duplication function and can indirectly make a unified control over data transmission of the terminal, and the reliability of data transmission can be improved.

In an embodiment, based on the device shown in FIG. 19, the device may further include:

a second sending portion, configured to send a second indication message to the terminal, the second indication message representing a deactivation instruction for the PDCP packet duplication function.

In the embodiment, the second indication message is sent to the terminal, the second indication message representing a deactivation instruction for the PDCP packet duplication function, so that the base station can deactivate the PDCP packet duplication function, the controllability of data transmission can be improved, and the reliability of data transmission can be improved.

In an embodiment, based on the device shown in FIG. 19, the device may further include:

a third sending portion, configured to send a third indication message to the terminal, the third indication message representing a de-configuration instruction for the PDCP packet duplication function.

In the embodiment, the third indication message is sent to the terminal, the third indication message representing the de-configuration instruction for the PDCP packet duplication function, so that the base station can de-configure the PDCP packet duplication function, the controllability of data transmission can be improved, and the reliability of data transmission can be improved.

In an embodiment, based on the device shown in FIG. 19, the device may further include:

a fourth sending portion, configured to send a fourth indication message to the terminal, the fourth indication message representing a de-configuration instruction for the PDCP packet duplication function and representing an RLC entity specified to be released.

In the embodiment, the fourth indication message is sent to the terminal, the fourth indication message representing a de-configuration instruction for the PDCP packet duplication function and representing an RLC entity specified to be released, so that the base station can de-configure the PDCP packet duplication function and also implement control over the RLC entity, the controllability of data transmission can further be improved, and the reliability of data transmission can be improved.

In an embodiment, based on the device shown in FIG. 19, the device may further include:

a fifth sending portion, configured to send a fifth indication message to the terminal, the fifth indication message representing a bearer splitting function configured for the RB by the base station.

In the embodiment, the fifth indication message is sent to the terminal, the fifth indication message representing a bearer splitting function configured for the RB by the base station, so that handover between the PDCP packet duplication function and the bearer splitting function can be implemented, one or more transmission functions can further be realized for the same RB by use of at least two shared transmission entities, transmission functions of the RB can be enriched, and practicability of data transmission can be improved.

The device embodiments substantially correspond to the method embodiments, and thus related parts refer to part of descriptions of the method embodiments. The device embodiments described above are only exemplary, portions described as separate parts therein may or may be not physically separated, and parts displayed as portions may or may be not physical units, and namely may be located in the same place or may be distributed to multiple networks. Part or all of the portions therein may be selected according to a practical requirement to achieve the solutions of the present disclosure. Each of the above described portions may be implemented by hardware, or software, or a combination of hardware and software.

The present disclosure also provides a non-transitory computer-readable storage medium, which has a computer program stored thereon, the computer program being configured to execute any data transmission method shown in FIG. 1 to FIG. 7.

The present disclosure also provides a non-transitory computer-readable storage medium, which has a computer program stored thereon, the computer program being configured to execute any data transmission method shown in FIG. 8 to FIG. 9.

The present disclosure also provides a data transmission device, which is applied to a terminal and includes: a processor; and a memory configured to store an instruction executable for the processor, wherein the processor is configured to: receive a first indication message from a base station, the first indication message including first information and the first information indicating a PDCP packet duplication function and at least two transmission entities configured for an RB by the base station; set a transmission function corresponding to the RB to be the PDCP packet duplication function according to the first indication message; set a transmission entity corresponding to the RB according to the at least two transmission entities indicated in the first indication message; set a present state of the PDCP packet duplication function, the present state including an activated state and a deactivated state; and perform data transmission according to the present state and the transmission entity.

Figure 21:
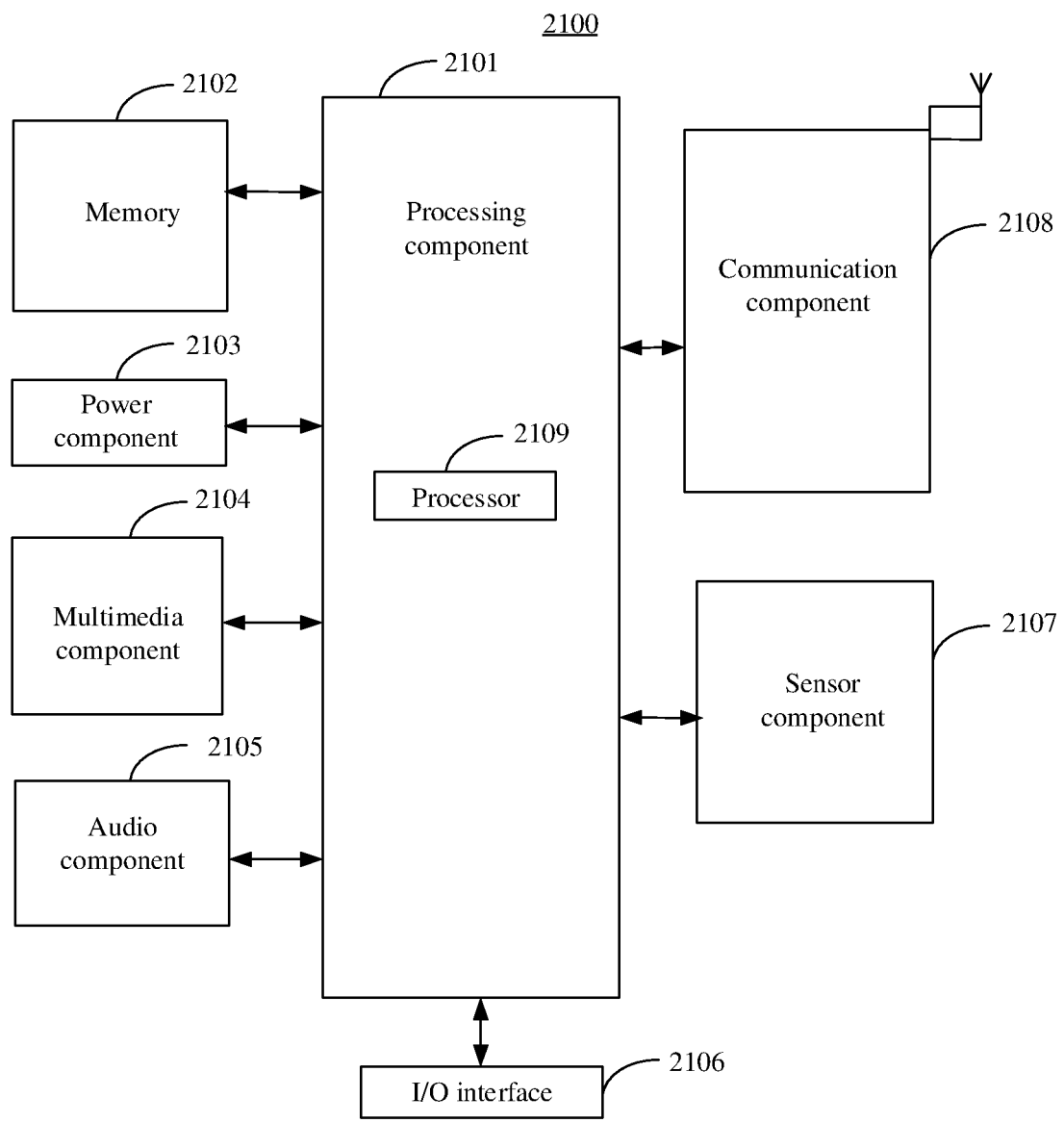
FIG. 21 is a structure diagram of a data transmission device according to an exemplary embodiment.

FIG. 21 illustrates a data transmission device 2100 according to an exemplary embodiment. The data transmission device 2100 may be a terminal such as a computer, a mobile phone, a digital broadcast terminal, a messaging device, a gaming console, a tablet, a medical device, exercise equipment and a personal digital assistant.

Referring to FIG. 21, the data transmission device 2100 may include one or more of the following components: a processing component 2101, a memory 2102, a power component 2103, a multimedia component 2104, an audio component 2105, an Input/Output (I/O) interface 2106, a sensor component 2107, and a communication component 2108.

The processing component 2101 is typically configured to control overall operations of the data transmission device 2100, such as the operations associated with display, telephone calls, data communications, camera operations, and recording operations. The processing component 2101 may include one or more processors 2109 to execute instructions to perform all or part of the steps in the abovementioned method. Moreover, the processing component 2101 may include one or more portions which facilitate interaction between the processing component 2101 and other components. For instance, the processing component 2101 may include a multimedia portion to facilitate interaction between the multimedia component 2104 and the processing component 2101.

The memory 2102 is configured to store various types of data to support the operation of the data transmission device 2100. Examples of such data may include instructions for any application programs or methods operated on the data transmission device 2100, contact data, phonebook data, messages, pictures, video, etc. The memory 2102 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 2103 is configured to provide power for various components of the data transmission device 2100. The power component 2103 may include a power management system, one or more power supplies, and other components associated with generation, management and distribution of power for the data transmission device 2100.

The multimedia component 2104 may include a screen for providing an output interface between the data transmission device 2100 and a user. In some embodiments, the screen may include a Liquid Crystal Display (LCD) and a Touch Panel (TP). If the screen includes the TP, the screen may be implemented as a touch screen to receive an input signal from the user. The TP may include one or more touch sensors to sense touches, swipes and gestures on the TP. The touch sensors may not only sense a boundary of a touch or swipe action but also detect a duration and pressure associated with the touch or swipe action. In some embodiments, the multimedia component 2104 may include a front camera and/or a rear camera. The front camera and/or the rear camera may receive external multimedia data when the data transmission device 2100 is in an operation mode, such as a photographing mode or a video mode. Each of the front camera and the rear camera may be a fixed optical lens system or have focusing and optical zooming capabilities.

The audio component 2105 is configured to output and/or input an audio signal. For example, the audio component 2105 may include a Microphone (MIC), and the MIC is configured to receive an external audio signal when the data transmission device 2100 is in the operation mode, such as a call mode, a recording mode and a voice recognition mode. The received audio signal may further be stored in the memory 2102 or sent through the communication component 2108. In some embodiments, the audio component 2105 may further include a speaker configured to output the audio signal.

The I/O interface 2106 is configured to provide an interface between the processing component 2101 and a peripheral interface portion, and the peripheral interface portion may be a keyboard, a click wheel, a button and the like. The button may include, but not limited to: a home button, a volume button, a starting button and a locking button.

The sensor component 2107 may include one or more sensors configured to provide status assessment in various aspects for the data transmission device 2100. For instance, the sensor component 2107 may detect an on/off status of the data transmission device 2100 and relative positioning of components, such as a display and small keyboard of the data transmission device 2100, and the sensor component 2107 may further detect a change in a position of the data transmission device 2100 or a component of the data transmission device 2100, presence or absence of contact between the user and the data transmission device 2100, orientation or acceleration/deceleration of the data transmission device 2100 and a change in temperature of the data transmission device 2100. The sensor component 2107 may include a proximity sensor configured to detect presence of an object nearby without any physical contact. The sensor component 2107 may also include a light sensor, such as a Complementary Metal Oxide Semiconductor (CMOS) or Charge Coupled Device (CCD) image sensor, configured for use in an imaging application. In some embodiments, the sensor component 2107 may also include an acceleration sensor, a gyroscope sensor, a magnetic sensor, a pressure sensor or a temperature sensor.

The communication component 2108 is configured to facilitate wired or wireless communication between the data transmission device 2100 and another device. The data transmission device 2100 may access a communication-standard-based wireless network, such as a Wireless Fidelity (WiFi) network, a 4th-Generation (4G) or 5th-Generation (5G) network or a combination thereof. In an exemplary embodiment, the communication component 2108 may receive a broadcast signal or broadcast associated information from an external broadcast management system through a broadcast channel. In an exemplary embodiment, the communication component 2108 may further include a Near Field Communication (NFC) portion to facilitate short-range communication. In an exemplary embodiment, the communication component 2108 may be implemented based on a Radio Frequency Identification (RFID) technology, an Infrared Data Association (IrDA) technology, an Ultra-WideBand (UWB) technology, a Bluetooth (BT) technology and another technology.

In an exemplary embodiment, the data transmission device 2100 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In an exemplary embodiment, there is also provided a non-transitory computer-readable storage medium including instructions, such as the memory 2102 including instructions, and the instructions may be executed by the processor 2109 of the data transmission device 2100 to implement the above described methods. For example, the non-transitory computer-readable storage medium may be a ROM, a Random Access Memory (RAM), a Compact Disc Read-Only Memory (CD-ROM), a magnetic tape, a floppy disc, an optical data storage device and the like.

The present disclosure also provides a data transmission device, which is applied to a base station and includes: a processor; and a memory configured to store an instruction executable for the processor, wherein the processor is configured to: configure a PDCP packet duplication function for an RB; configure at least two transmission entities configured to implement the PDCP packet duplication function; add first information into a first indication message, the first information indicating the PDCP packet duplication function and the at least two transmission entities; and send the first indication message to a terminal to enable the terminal to set a transmission function corresponding to the RB to be the PDCP packet duplication function according to the first indication message and set a transmission entity corresponding to the RB according to the at least two transmission entities indicated in the first indication message.

Figure 22:
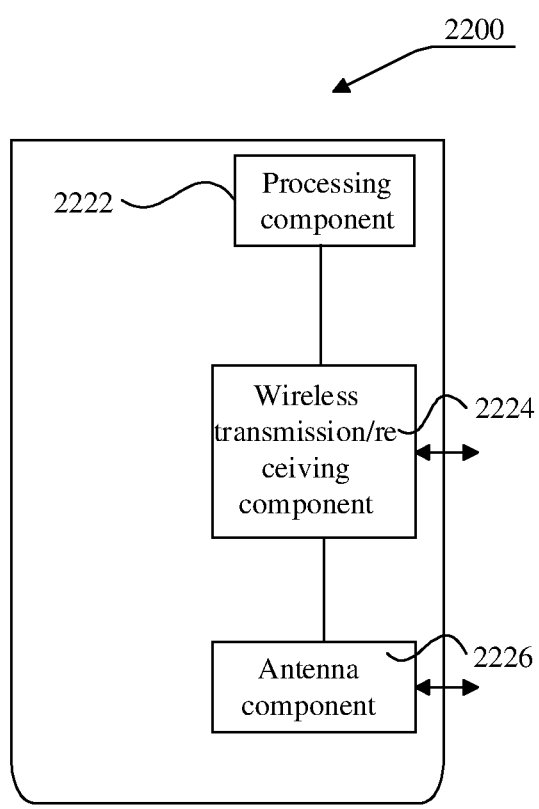
FIG. 22 is a structure diagram of a data transmission device according to an exemplary embodiment.

FIG. 22 is a block diagram of a data transmission device 2200 according to an exemplary embodiment. The data transmission device 2200 may be provided as a base station. Referring to FIG. 22, the data transmission device 2200 includes a processing component 2222, a wireless transmission/receiving component 2224, an antenna component 2226 and a wireless interface-specific signal processing part, and the processing component 2222 may further include one or more processors.

One processor in the processing component 2222 may be configured to execute the above described data transmission methods.

The technical solutions provided in the embodiments of the present disclosure may have the following beneficial effects.

In the embodiments of the present disclosure, a terminal may receive a first indication message from a base station, the first indication message including first information and the first information indicating a PDCP packet duplication function and at least two transmission entities configured for an RB by the base station, set a transmission function corresponding to the RB to be the PDCP packet duplication function according to the first indication message, set a transmission entity corresponding to the RB according to the at least two transmission entities indicated in the first indication message, set a present state of the PDCP packet duplication function, the present state including an activated state and a deactivated state, and perform data transmission according to the present state of the PDCP packet duplication function and the transmission entity corresponding to the RB, so that data transmission for the PDCP packet duplication function can be implemented, and reliability of the data transmission can be improved.

In the embodiments of the present disclosure, the terminal may further set a primary RLC entity and a secondary RLC entity corresponding to the RB according to the primary RLC entity and secondary RLC entity configured for the RB by the base station to satisfy the two transmission entities needed for implementing the PDCP packet duplication function and may transmit the PDCP packet and the PDCP packet duplicate through the two transmission entities, so that the speed of the data transmission can be increased, the reliability of the data transmission can be improved, and the low sending success rate can be upgraded when the PDCP packet and the PDCP packet duplicate are transmitted on the same transmission entity.

In the embodiments of the present disclosure, the terminal may further set a present state of the PDCP packet duplication function according to a configuration of the base station and, in a case that there is no configuration of the base station, the terminal may also set the present state of the PDCP packet duplication function according to a system default initial state, so that subsequent data transmission can be ensured to be carried out according to the present state, and the diversity of data transmission can be improved.

In the embodiments of the present disclosure, in a case that the PDCP packet duplication function has not yet been activated, the terminal is required to distinguish whether the RB is a newly established SRB or DRB or is an SRB or DRB that has been established for data transmission, and particularly for the SRB or DRB that has been established, the terminal is further required to distinguish whether data transmission is for the data that is not delivered to an RLC layer or the data that has been delivered to the secondary RLC entity, so that different processing can be implemented for data that is not sent and data that has been sent, and the reliability of data transmission can be improved.

In the embodiments of the present disclosure, the terminal, in a case that data transmission is performed by use of the primary RLC entity for the data that is not delivered to the RLC layer and the data that has been delivered to the secondary RLC entity but has not yet been successfully sent, may reconstruct the secondary RLC entity that has been constructed, namely deleting data in the secondary RLC entity that has been constructed, so as to prepare for subsequent data transmission and improve the reliability of data transmission.

In the embodiments of the present disclosure, after the PDCP packet duplication function is activated, the terminal may need to use the two transmission entities, i.e., the primary RLC entity and the secondary RLC entity, for data transmission and send the PDCP packet and the PDCP packet duplicate through the primary RLC entity and the secondary RLC entity respectively or adopt different transmission manners under the AM or the UM, so that the data that is not sent and data that has been sent can be transmitted in multiple transmission manners, the reliability of data transmission can be ensured, and meanwhile, the efficiency of data transmission can be also improved.

In the embodiments of the present disclosure, the terminal, after receiving from the base station a deactivation instruction for the PDCP packet duplication function, may reconstruct the secondary RLC entity and perform data transmission by use of the primary RLC entity, so that successful data transmission can still be ensured when the PDCP packet duplication function is deactivated, and the reliability of data transmission can be improved.

In the embodiments of the present disclosure, the terminal, after receiving from the base station a deactivation instruction for the PDCP packet duplication function, may reconstruct the secondary RLC entity and perform data transmission by use of the primary RLC entity, so that successful data transmission can still be ensured when the PDCP packet duplication function is deactivated, and the reliability of data transmission can be improved.

In the embodiments of the present disclosure, the terminal, after receiving information about a de-configuration instruction for the PDCP packet duplication function and an RLC entity specified to be released from the base station, may release the RLC entity specified to be released and perform data transmission by use of an RLC entity not specified to be released, so that successful data transmission can still be ensured by use of the RLC entity not specified to be released when the PDCP packet duplication function is de-configured and the base station specifies the RLC entity to be released, and the reliability of data transmission can be improved.

In the embodiments of the present disclosure, the terminal, after receiving a bearer splitting function configured for the RB by the base station, may further disable the PDCP packet duplication function and enable the bearer splitting function and may transmit the data that has been delivered to the RLC layer in more than one manner, so that successful data transmission can still be ensured even when handover is performed between different functions, and the reliability of data transmission can be improved.

In the embodiments of the present disclosure, the base station may configure the PDCP packet duplication function for the RB, configure the at least two transmission entities configured to implement the PDCP packet duplication function, add the first information into the first indication message, the first information indicating the PDCP packet duplication function and representing the at least two transmission entities configured for the RB by the base station, and send the first indication message to the terminal to enable the terminal to set a transmission function corresponding to the RB as the PDCP packet duplication function according to the first indication message and set a transmission entity corresponding to the RB according to the at least two transmission entities indicated in the first indication message, and then the terminal may set the transmission entity corresponding to the RB according to the at least two transmission entities indicated in the first indication message, set the present state of the PDCP packet duplication function, the present state including the activated state and the deactivated state, and perform data transmission according to the present state of the PDCP packet duplication function and the transmission entity corresponding to the RB, so that data transmission for the PDCP packet duplication function can be implemented, and the reliability of data transmission can be improved.

In the embodiments of the present disclosure, the base station may further configure an initial state of the PDCP packet duplication function, the initial state being the activated state or the deactivated state, to enable the terminal to set the present state of the PDCP packet duplication function according to the configuration of the base station and further perform data transmission according to the present state, and then the base station may flexibly determine whether to activate the PDCP packet duplication function or not, so that the base station can control the initial state of the PDCP packet duplication function and can indirectly make a unified control over data transmission of the terminal, and the reliability of data transmission can be improved accordingly.

In the embodiments of the present disclosure, the base station may further send a second indication message to the terminal, the second indication message representing a deactivation instruction for the PDCP packet duplication function, so that the base station can deactivate the PDCP packet duplication function, the controllability of data transmission can be upgraded, and the reliability of data transmission can be improved.

In the embodiments of the present disclosure, the base station may further send a third indication message to the terminal, the third indication message representing a de-configuration instruction for the PDCP packet duplication function, so that the base station can de-configure the PDCP packet duplication function, the controllability of data transmission can be upgraded, and the reliability of data transmission can be improved.

In the embodiments of the present disclosure, the base station may further send a fourth indication message to the terminal, the fourth indication message representing a de-configuration instruction for the PDCP packet duplication function and representing an RLC entity specified to be released, so that the base station can de-configure the PDCP packet duplication function and also implement control over the RLC entity, the controllability of data transmission can be further upgraded, and the reliability of data transmission can be improved.

In the embodiments of the present disclosure, the base station may further send a fifth indication message to the terminal, the fifth indication message representing a bearer splitting function configured for the RB by the base station, so that handover between the PDCP packet duplication function and the bearer splitting function can be implemented, one or more transmission functions can further be realized for the same RB by use of at least two shared transmission entities, transmission functions of the RB can be enriched, and the practicability of data transmission can be improved.

Other implementation solutions of the present disclosure will be apparent to those skilled in the art from consideration of the specification and practice of the present disclosure. This disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for data transmission, implemented by a terminal, the method comprising:
   receiving a first indication message from a base station, wherein the first indication message comprises first information indicating a Packet Data Convergence Protocol (PDCP) packet duplication function and at least two transmission entities configured for a radio bearer (RB) by the base station;
   setting a transmission function corresponding to the RB to be the PDCP packet duplication function according to the first indication message;
   setting a transmission entity corresponding to the RB according to the at least two transmission entities indicated in the first indication message;
   setting a present state of the PDCP packet duplication function, the present state being one of an activated state or a deactivated state; and
   performing data transmission according to the present state and the transmission entity.

2. The method of claim 1, wherein the at least two transmission entities comprise a primary radio link control (RLC) entity and a secondary RLC entity, and
   setting the transmission entity corresponding to the RB according to the at least two transmission entities indicated in the first indication message comprises:
   when the RB is a newly established signaling radio bearer (SRB) or data radio bearer (DRB), constructing a first RLC entity and a second RLC entity, setting the first RLC entity as the primary RLC entity, and setting the second RLC entity as the secondary RLC entity; and
   when the RB is an SRB or DRB that has been established, setting one RLC entity that has been constructed as the primary RLC entity, and setting another RLC entity that has been constructed as the secondary RLC entity.

3. The method of claim 1, wherein setting the present state of the PDCP packet duplication function comprises at least one of:
   setting the present state to be a system default initial state, the system default initial state comprising the activated state or the deactivated state; or
   when the first indication message further comprises second information, the second information indicates an initial state, configured by the base station, of the PDCP packet duplication function and the initial state is the activated state or the deactivated state, setting the present state to be the initial state, configured by the base station, of the PDCP packet duplication function according to the second information.

4. The method of claim 1, wherein the present state of the PDCP packet duplication function is the deactivated state, the transmission entity comprises a primary radio link control (RLC) entity and a secondary RLC entity, and
   performing the data transmission according to the present state and the transmission entity comprises:
   when the RB is a newly established signaling radio bearer (SRB) or data radio bearer (DRB), performing the data transmission by the primary RLC entity; and
   when the RB is an SRB or DRB that has been established, performing at least one of:
   performing the data transmission by the primary RLC entity for data that is not delivered to an RLC layer and continuing the data transmission by the secondary RLC entity for data that has been delivered to the secondary RLC entity, or in an Unacknowledged Mode (UM), performing the data transmission by the primary RLC entity for data that is not delivered to the RLC layer.

5. A method for data transmission, implemented by a base station, the method comprising:
sending a first indication message to a terminal, wherein the first indication message comprises first information indicating a Packet Data Convergence Protocol (PDCP) packet duplication function and at least two transmission entities configured for a radio bearer (RB), and the first information is configured to indicate the terminal to:
set a transmission function corresponding to the RB to be the PDCP packet duplication function;
set a present state of the PDCP packet duplication function, the present state being one of an activated state or a deactivated state; and
perform data transmission according to the present state and a transmission entity.

6. The method of claim 5, wherein the at least two transmission entities comprise a primary radio link control (RLC) entity and a secondary RLC entity, and the first information is configured to indicate the terminal to:
when the RB is a newly established signaling radio bearer (SRB) or data radio bearer (DRB), construct a first RLC entity and a second RLC entity, set the first RLC entity as the primary RLC entity and set the second RLC entity as the secondary RLC entity; and
when the RB is an SRB or DRB that has been established, set one RLC entity that has been constructed as the primary RLC entity and set another RLC entity that has been constructed as the secondary RLC entity.

7. The method of claim 5, wherein the first information is configured to indicate the terminal to:
set the present state of the terminal to be a system default initial state, the system default initial state comprising the activated state or the deactivated state.

8. The method of claim 5, wherein the first indication message further comprises second information configured to indicate an initial state of the PDCP packet duplication function and the initial state is the activated state or the deactivated state, wherein the second information is configured to indicate the terminal to set the present state to be the initial state of the PDCP packet duplication function.

9. The method of claim 5, wherein the PDCP packet duplication function is in the deactivated state, the transmission entity comprises a primary radio link control (RLC) entity and a secondary RLC entity, and the first information is configured to indicate the terminal to perform the data transmission by the primary RLC entity when the RB is a newly established signaling radio bearer (SRB) or data radio bearer (DRB).

10. The method of claim 5, wherein the PDCP packet duplication function is in the deactivated state, the transmission entity comprises a primary radio link control (RLC) entity and a secondary RLC entity, and the first information is configured to indicate the terminal to perform the data transmission by the primary RLC entity for data that is not delivered to an RLC layer and continue the data transmission by the secondary RLC entity for data that has been delivered to the secondary RLC entity.

11. The method of claim 10, wherein the first information is configured to indicate the terminal to reconstruct the secondary RLC entity that has been constructed.

12. The method of claim 5, wherein the PDCP packet duplication function is in the deactivated state, the transmission entity comprises a primary radio link control (RLC) entity and a secondary RLC entity, and the first information is configured to indicate the terminal in an Unacknowledged Mode (UM) to perform the data transmission by the primary RLC entity for data that is not delivered to the RLC layer.

13. A device for data transmission, comprising:
a processor; and
a memory storing instructions executable by the processor,
wherein the processor is configured to:
send a first indication message to a terminal, wherein the first indication message comprises first information indicating a Packet Data Convergence Protocol (PDCP) packet duplication function and at least two transmission entities configured for a radio bearer (RB), and the first information is configured to indicate the terminal to:
set a transmission function corresponding to the RB to be the PDCP packet duplication function;
set a present state of the PDCP packet duplication function, the present state being one of an activated state or a deactivated state; and
perform data transmission according to the present state and a transmission entity.

14. The device of claim 13, wherein the at least two transmission entities comprise a primary radio link control (RLC) entity and a secondary RLC entity, and the first information is configured to indicate the terminal to:
when the RB is a newly established signaling radio bearer (SRB) or data radio bearer (DRB), construct a first RLC entity and a second RLC entity, set the first RLC entity as the primary RLC entity and set the second RLC entity as the secondary RLC entity; and
when the RB is an SRB or DRB that has been established, set one RLC entity that has been constructed as the primary RLC entity and set another RLC entity that has been constructed as the secondary RLC entity.

15. The device of claim 13, wherein the first information is configured to indicate the terminal to:
set the present state of the terminal to be a system default initial state, the system default initial state comprising the activated state or the deactivated state.

16. The device of claim 13, wherein the first indication message further comprises second information configured to indicate an initial state of the PDCP packet duplication function and the initial state is the activated state or the deactivated state, wherein the second information is configured to indicate the terminal to set the present state to be the initial state of the PDCP packet duplication function.

17. The device of claim 13, wherein the PDCP packet duplication function is in the deactivated state, the transmission entity comprises a primary radio link control (RLC) entity and a secondary RLC entity, and the first information is configured to indicate the terminal to perform the data transmission by the primary RLC entity when the RB is a newly established signaling radio bearer (SRB) or data radio bearer (DRB).

18. The device of claim 13, wherein the PDCP packet duplication function is in the deactivated state, the transmission entity comprises a primary radio link control (RLC) entity and a secondary RLC entity, and the first information is configured to indicate the terminal to: perform the data transmission by the primary RLC entity for data that is not delivered to an RLC layer and continue the data transmission by the secondary RLC entity for data that has been delivered to the secondary RLC entity.

19. The device of claim 18, wherein the first information is configured to indicate the terminal to reconstruct the secondary RLC entity that has been constructed.

20. The device of claim 13, wherein the PDCP packet duplication function is in the deactivated state, the transmission entity comprises a primary radio link control (RLC) entity and a secondary RLC entity, and the first information is configured to indicate the terminal in an Unacknowledged Mode (UM) to perform the data transmission by the primary RLC entity for data that is not delivered to the RLC layer.

* * * * *